United States Patent [19]

Cox

[11] 4,042,873

[45] Aug. 16, 1977

[54] PHASE LOCKED FIRING CIRCUIT FOR SCR'S, OR THE LIKE

[75] Inventor: Jay Ashton Cox, Rolling Hills Estates, Calif.

[73] Assignee: Guldon Industries, Inc., Metuchen, N.J.

[21] Appl. No.: 745,085

[22] Filed: Nov. 26, 1976

[51] Int. Cl.² ............................................. H02M 7/00
[52] U.S. Cl. ................................ 363/129; 307/252 N; 363/128
[58] Field of Search ....... 307/252 N, 252 Q, 252 UA; 321/5, 47; 323/22 SC

[56] References Cited

U.S. PATENT DOCUMENTS

| | | | |
|---|---|---|---|
| 3,582,685 | 6/1971 | Bolmgren | 307/252 N |
| 3,609,517 | 9/1971 | Tucker | 307/252 N X |
| 3,671,836 | 6/1972 | Kolatorowicz et al. | 321/5 X |
| 3,683,262 | 8/1972 | Neusser et al. | 321/47 X |
| 3,932,766 | 1/1976 | Kudeljan et al. | 307/255 UA X |
| 3,942,041 | 3/1976 | Morriss | 307/252 N X |
| 3,978,394 | 8/1976 | Quayle | 323/22 SC X |
| 3,999,114 | 12/1976 | Poppinger et al. | 321/47 |

Primary Examiner—William M. Shoop
Attorney, Agent, or Firm—Blakely, Sokoloff, Taylor & Zafman

[57] ABSTRACT

A circuit for providing firing signals for SCR's, particularly suitable for use where the power waveform is distorted. The firing signals are based on fixed angles of the power signal rather than on a time basis. Ramp signals from a ramp generator are compared with a loop error voltage or reference voltage for providing the SCR firing signals. A voltage controlled oscillator in a phase locked loop generates an undistorted signal used to start the ramp generator. The output of a lowpass filter in the phase locked loop provides a frequency compensating signal for controlling the slope of the ramp signals.

9 Claims, 3 Drawing Figures

PHASE LOCKED FIRING CIRCUIT FOR SCRS, OR THE LIKE

BACKGROUND OF THE INVENTION

1. Field of the Invention

The invention relates to circuits for controlling silicon controlled rectifiers, or the like.

2. Prior Art

Silicon controlled rectifiers (SCRs), and like devices have been employed for a number of years in rectifiers, latching switches, amplifiers, and other applications. One of the most common uses for such devices is for the rectification of alternating current (AC) power to provide direct current (DC) power. Numerous control circuits are known for providing the firing pulses which initiate the conduction in the SCRs. These circuits include the half-wave R-C-diode firing circuit, on-off magnetic firing circuit, phase control firing circuits, reversing type control circuits, and numerous other circuits.

Special circuits have been developed for controlling SCRs in larger power applications, particularly where multi-phase AC power is rectified. One such firing circuit generates ramp signals, which signals are compared with a loop (analog) error voltage or with a fixed reference voltage. The results of this comparison are used to generate firing signals or pulses. The ramp generators used in this circuit are triggered at the AC power signals, by way of example, when these signals pass through zero volts. Thus the firing pulses occur at a fixed time following the "zero-crossing" of the AC power signal.

In some instances the AC power signal becomes very distorted. This distortion may include the introduction of harmonics into the power waveform, changes of frequency, and other distortions. Typical firing circuits rely on the AC power signal as a reference signal and do not operate properly when the AC power signal is distorted or of varying frequency. For example, the zero-crossing of the AC signal may be substantially shifted when harmonics are introduced into the signal. Also where ramp signals are employed with comparators, a change in frequency of the power signal causes a change in the electrical angle, but not the time at which the firing pulses occur. Unless the SCRs are precisely fired, i.e. ideally firing at a fixed electrical angle, inefficient rectification occurs. In some cases, SCRs are misfired due to distortion in the power waveform, causing a malfunction in the rectifier and introducing spurious disturbance into associated control and regulation loops.

Distortion of the AC power signal may be caused by the generation means, by the load, by the transmission means used to couple the generation means with the load, or some combination of these elements. In one specific application the output of a high inertia, three-phase alternator is rectified and used to drive a large electromagnet. The magnet is energized for short periods (e.g. 1 to 10 seconds) during which time power (with peaks in the megawatt range) is transferred from the alternator to the magnet. (The electromagnet is used in plasma experiments). Because of the inductive nature of this load, substantial distortion occurs in the AC power signal. Moreover, the fundamental frequency of this signal changes, that is, the rate of rotation of the alternator slows when the load is applied. The firing circuit of the present invention performs well in this application. It will be obvious to one skilled in the art that the inventive concepts disclosed in this patent may be used in numerous other applications.

SUMMARY OF THE INVENTION

An improved firing circuit, particularly suitable for use in a power rectifier employing SCRs, or the like, is disclosed. A voltage controlled oscillator is employed in a phase locked loop to provide a signal which initiates the generation of ramp signals by a ramp generator. Thus, the output of the voltage controlled oscillator is coupled to the ramp generator and to a phase detector. The phase detector compares the phase of the oscillator output with the phase of the AC power signal. The output of this detector is coupled to a lowpass filter. The lowpass filter's output is used to control the oscillator's frequency and as a control signal in the ramp generator.

The output of the ramp generator is coupled to a comparator and compared with either a loop analog error voltage or with a predetermined reference voltage. The comparator's output, in turn, is coupled to a firing pulse driver which provides the firing pulses for the SCRs. The slope of the ramp signals is controlled by the output of the lowpass filter. Frequency compensation to the ramp signals is thus provided. Since the AC power signal is not applied directly to the ramp generators, (as in some prior art circuits) distortion of this signal does not affect the generation of the ramp signals. In effect, the firing pulses occur at a fixed electrical angle rather than at a fixed time following zero voltage cross over.

In the presently preferred embodiment an input three phase power signal is converted to a twelve phase signal. Also, the output of the voltage controlled oscillator is converted to a twelve phase signal. These two twelve phase signals are phase detected and the results of such detection are summed. The resultant signal after passing through a lowpass filter is used to control the oscillator and the slopes of the ramp signals.

DETAILED DESCRIPTION OF THE INVENTION

A circuit for providing firing signals for SCRs, particularly suitable for use with a distorted power waveform is described. In the following description of the presently preferred embodiment, numerous details such as the specific number of phases specific components, and other details are given to provide a thorough understanding of the inventive concepts. However, it will be obvious to one skilled in the art that these inventive concepts may be employed without using the specific details set forth below. In other cases in order not obscure these inventive concepts in unnecessary details, well-known circuits have been shown in block diagram form.

Figure 1:
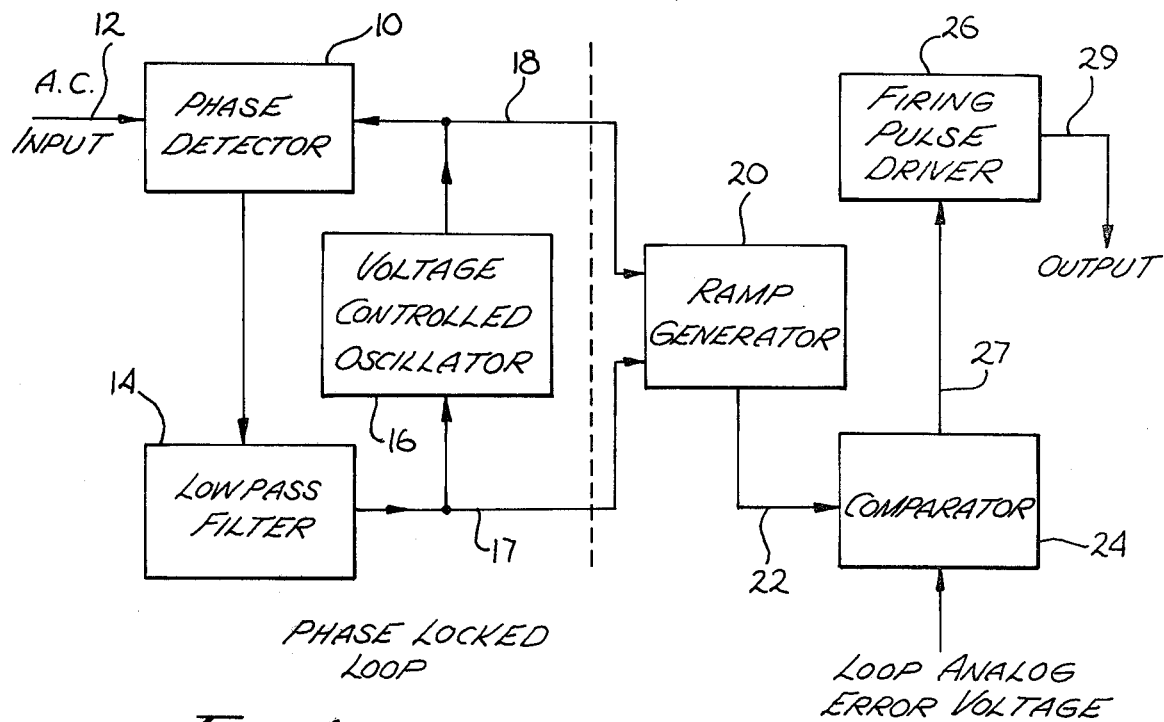
FIG. 1 is a general block diagram of the invented firing circuit.

Referring now to the block diagram of FIG. 1, the firing circuit receives the AC power signal on line 12, this signal is also applied to the SCRs, or like devices for rectification. The output of the firing pulse driver 26, line 29, is applied to the gate terminals of SCRs to trigger these devices into conduction. For the block diagram of FIG. 1 it will be assumed that the AC input signal on line 12 is a single phase signal.

The voltage controlled oscillator 16 of FIG. 1, which may be an ordinary oscillator means, has a nominal frequency equal to the nominal frequency of the AC signal applied to line 12. The output of this oscillator, line 18, is applied to the phase detector 10 and also to a ramp generator 20. The phase detector 10 compares the phases of the signal generated by oscillator 10 with the AC signal on line 12. An ordinary phase detector may be employed for this purpose. The output of this phase detector (which is representative of the beat frequency of the signals on lines 12 and 18) is coupled to a lowpass filter 14. The output of the filter 14, line 17, is coupled to the voltage controlled oscillator 16 and to the ramp generator 20. This output is a DC signal proportional to the phase deviation of the average input AC signal from that of the nominal oscillator frequency, in the presently preferred embodiment. The oscillator 16 employs this signal as a control signal such that the oscillator frequency remains equal to the frequency of the AC signal on line 12.

Thus as may be seen in FIG. 1, the phase detector 10 and filter 14 form a closed, phase locked loop with the oscillator 16. This loop synchronizes the voltage controlled oscillator 16 to the frequency of the AC (input) signal. As is apparent, if the frequency of the input signal changes, the frequency of the oscillator 16 will likewise change.

Figure 3:
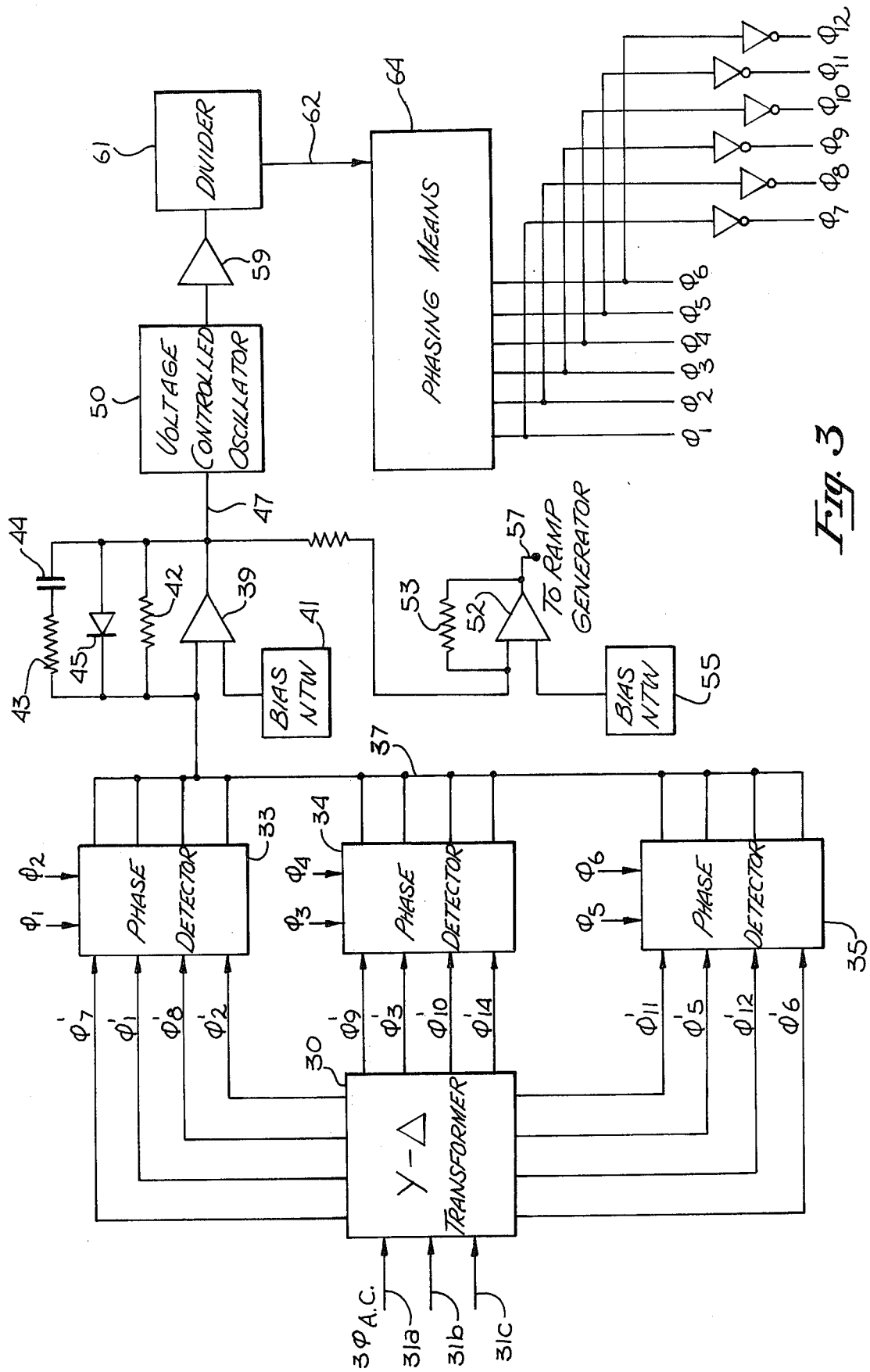
FIG. 3 is a detailed block diagram and partial schematic of the presently preferred embodiment of the phase detector, lowpass filter and voltage controlled oscillator of FIG. 1.

In the prior art, the AC input signal on line 12 is applied to a ramp generator such as ramp generator 20 to initiate the generation of ramp signals. Distortion of this input signal prevented consistent and accurate initiation of the ramp signals. However, with the circuit of FIG. 1 the distortion-free output of oscillator 16 is employed to initiate the generation of ramp signals by the ramp generator 20. The phase detector 10, particularly the phase detector employed in the presently preferred embodiment which will be described in conjunction with FIG. 3, is not significantly affected by distortion of the AC input signal.

The ramp generator 20 generates ramp signals which signals are coupled by line 22 to a comparator 24. Within comparator 24 these ramp signals are compared with either a loop analog error voltage or with a fixed reference voltage. The loop analog error voltage which is employed in the presently preferred embodiment, may be developed within the rectifier employing known circuits. The ramp generator 20, in the presently preferred embodiment, initiates the generation of a ramp signal on line 22 each time the sinusoidal signal on line 18 changes from a negative potential to a positive potential (at zero volts).

The comparator 24 generates an output signal on line 27 when the ramp signal on line 22 is equal to (or is a predetermined proportion of) the loop analog error voltage. The signal on line 27 causes the firing pulse driver 26 to generate a firing pulse on line 29, which pulse triggers an SCR into conduction. Well-known circuits may be employed for ramp generator 20, comparator 24 and the firing pulse driver 26.

In the prior art, where ramp generators are employed along with comparators, the slope of the ramp signals remain substantially constant even though the frequency of the AC power signal varied. When the frequency of the AC signal deviates from its expected frequency, the ramp signal causes the SCRs to fire either too soon or too late. In these circuits the firing pulses occur at a fixed time following the initiation of the ramp signals for a given loop error voltage. With the circuit of FIG. 1, however, frequency compensation to the ramp signals is provided by the output of filter 14. The signal on line 17 is employed by ramp generator 20 to compensate the ramp signals for frequency variations in the input AC signal. In the presently preferred embodiment, the slope of the ramp signals are adjusted to compensate for the frequency variations. This compensation causes the firing pulses to occur at a fixed angle of a varying power line frequency (rather than a fixed time) for a given loop error voltage.

In FIG. 3, the input AC power signal is a three-phase power signal which is coupled to a Y-Δ transformer 30 via lines 31a, 31b and 31c. These leads also couple the A.C. source of supply to the SCRs, or like devices. The transformer 30 converts the three-phase input signal into a 12-phase signal, each phase of which is designated as $\phi'_n$. Four phases of the output signal from transformer 30 are coupled to a phase detector 33, four other phases of this output signal are coupled to the phase detector 34, and the remaining four phases are coupled to the phase detector 35.

The phase detectors 33, 34 and 35 compare the phases of the $\phi'_n$ signals ($\phi_1$ through $\phi'_{12}$) with the phases of the $\phi_n$ signals ($\phi_1$ through $\phi_{12}$). The $\phi_1$ and $\phi_2$ signals are coupled to the detector 33, the $\phi_3$ and $\phi_4$ signals to the detector 34 and the $\phi_5$ and $\phi_6$ signals to the detector 35. For reasons which will be explained, only the phases $\phi_1$ through $\phi_6$ necessary for this phase detection. In the presently preferred embodiment, the phase detection is performed by semiconductor switches, each of which are equivalent to single pole-single throw switch. By analogy, the $\phi'_n$ signals are coupled to the switch arms, the $\phi'_n$ signals are coupled to the switch arms, the $\phi_n$ signals are employed to activte the switch arms and the output of the detectors (all of which are coupled to line 37) are coupled to the switch contacts.

The semiconductor switches employed for the phase detection are commercially available and are packaged with four switches per package, thus three separate detectors are shown in FIG. 3 (Commercial Part No. LF 13333). Each detector or package, such as detector 33, includes two normally opened switches and two normally closed switches. By coupling a $\phi_n$ signal to both a normally opened switch and a normally closed switches and two of both $\phi_n$ and $-\phi_n$ is obtained. For the 12-phase system employed, $-\phi_n$ is equivalent to $\phi_{n+6}$. Thus, while only the $\phi_1$ and $\phi_2$ signals are shown coupled to detector 33, in effect, detection of the $\phi_1$, $\phi_2$, $\phi_7$ and $\phi_8$ signals occurs. For this reason only the $\phi_1$ through $\phi_6$ signals are necessary for the detection performed by detectors 33, 34 and 35.

The output of the detectors 33, 34 and 35 are summed (current summing) on line 37. The signal on this line is coupled to one input terminal of an operational amplifier 39. The other input terminal to this amplifier is coupled to a biasing network 41. The output of amplifier 39, line 47, is coupled to an input terminal of this amplifier through resistor 42, diode 45, and the series coupled capacitor 44 and resistor 43. The feedback provided by these devices permits the amplifier 39 to operate as an active, lowpass filter. This filter is the equivalent to the filter 14 described in conjunction with FIG. 1.

The voltage controlled oscillator 50 which may be an ordinary oscillator means, in the presently preferred embodiment, has a nominal frequency which is ten times the nominal frequency of the three-phase input power signal (lines 31a, 31b, and 31c). The output of this oscillator which is coupled to amplifier 59, is synchronized at 120 times the input AC signal by the signal on line 47. The oscillator output after passing through the buffer amplifier 59 is coupled to a divider 61. Divider 61 divides the output of the oscillator 50 by 10, and the phasing means 64 divides by an additional 12, so that the frequency of the input signal on line 62 is equal to the frequency of the input AC signal.

Line 62 is coupled to a phasing means 64. The phasing means 64 is employed to convert the signal on line 62 into six signals of the same frequency, however, separated one from the other, by a phase difference of 30°. These signals are designated as $\phi_1$ through $\phi_6$ in FIG. 3. These signals are, in turn, coupled through inverters as shown in FIG. 3, to provide signals $\phi_7$ through $\phi_{12}$. Thus the signals $\phi_1$ through $\phi_{12}$ are separated, one from the other, by a phase difference of 30°.

In the presently preferred embodiment the phasing means 64 is an integrated circuit (CMOS) "divide-by-$n$" counter. Commercially available counters may be employed for this function such as Part No. CD4018AE.

Line 47, the output of the lowpass filter, is also coupled to one input terminal of an operational amplifier 52. The other input terminal of this operational amplifier is coupled to a biasing network 55. Feedback is provided through resistor 53 from the output terminal of amplifier 52 to one of its input terminals. The output of this amplifier, line 57, is coupled to the ramp generator shown in FIG. 2. The amplifier 52, as well as the amplifier 39, may be commercially available operational amplifiers such as Part No. 741.

Figure 2:
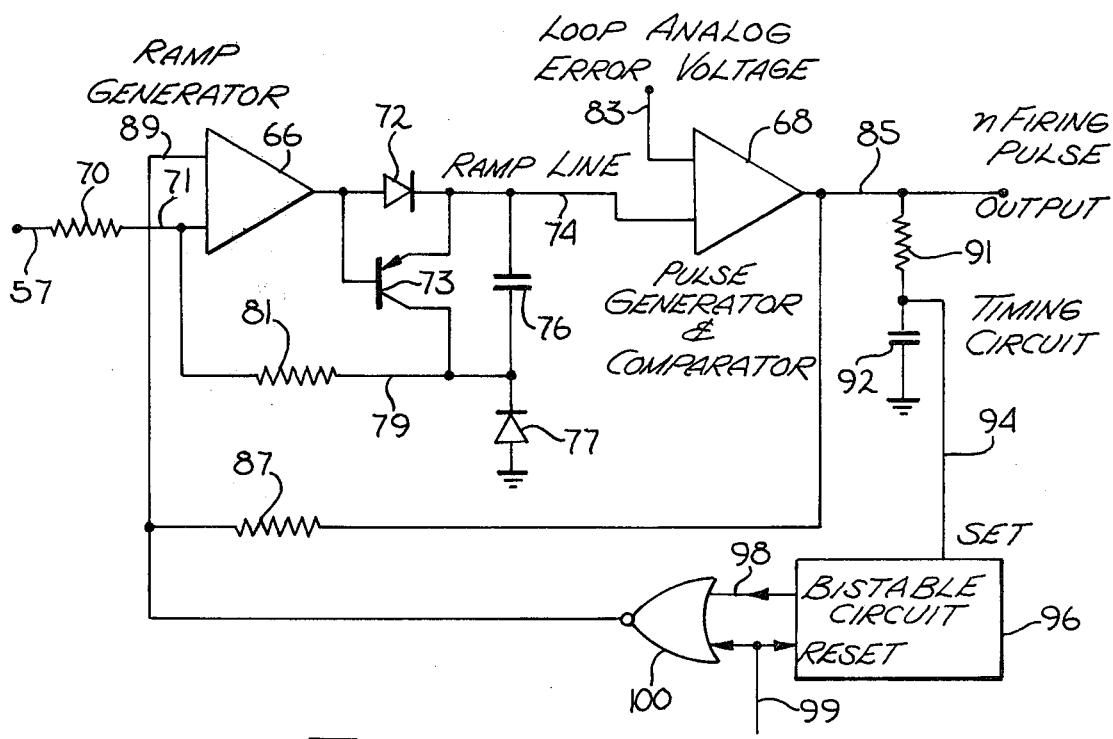
FIG. 2 is a schematic of the presently preferred embodiment of the ramp generator, comparator means and firing pulse driver of FIG. 1.

Referring now to FIG. 2, line 57 is coupled through resistor 70 to one input terminal 71 of an amplifier 66. The output of the amplifier 66 is coupled to one terminal of a diode 72 and to the base terminal of a transistor 73. The other terminal of the diode 72 is coupled to the ramp line 74, which line is common with one terminal of the capacitor 76, and with the emitter terminal of transistor 73. Line 74 is coupled to one of the input terminals of an operational amplifier 68. The collector terminal of transistor 73 is coupled to the other terminal of the capacitor 76, to ground through a diode 77, and to the input terminal 71 of amplifier 66 through a resistor 81.

Amplifier 68 in addition to receiving a signal on line 74, has its other input terminals 83 coupled to the source of the loop analog error voltage. The output of amplifier 68, line 85, is coupled to the other input terminal 89 of amplifier 66 through a resistor 87. This line is also coupled to ground through the series combination of a resistor 91 and a capacitor 92. The common junction between resistor 91 and capacitor 92 is coupled to the set terminal of a bistable circuit 96. The output of this bistable circuit, line 98, is coupled to one of the input terminal of a NOR gate 100. The other input terminal of this NOR gate is coupled to line 99. Line 99 is also coupled to the reset terminal of the bistable circuit 96. The output of the NOR gate 100 is coupled to the input terminal 89 of amplifier 66. Line 99 is coupled to receive the $\phi_{n+9}$ signal (one of the output signals from the phasing means 64 of FIG. 3). Note that line 85 provides the $n$ firing pulse.

The entire circuit for providing the firing signals for SCRs, or the like, includes the circuit shown in FIG. 3 plus 12 of the circuits shown in FIG. 2. Thus there are 12 firing lines such as line 85 for triggering the SCRs.

Assume for purposes of discussion that the frequency of the output signal of oscillator 50 is precisely 10 times that of the AC power signal (lines 31a, 31b and 31c FIG. 3). This oscillator signal after being divided by 10 is applied to the phasing means 64 on line 62. The counters of the phasing means 64 provide the $\phi_1$ through $\phi_6$ signals which signals are coupled to the detectors 33, 34 and 35 and compared with the 12 signals from transformer 30 ($\phi_1$ through $\phi'_{12}$). Assume further for sake of discussion that since the frequency of the oscillator is precisely synchronized by the phase locked loop with the input AC signal, only an extremely small potential is present on line 37. (For purposes of explanation, biasing potentials, etc., not necessary for understanding the operation of the firing circuit are not described). This small signal on line 37 is such that precisely the correct signal will be present on line 47 to generate 120 times the line frequency by oscillator 50.

Referring now to FIG. 2 assume that the $\phi_{n+9}$ signal is not present, and furthermore that the bistable circuit 96 is set such that a signal is present on line 98. With a signal on line 98 no output signal will be present at the output of the NOR gate 100. Thus, no signal is applied to terminal 99 of amplifier 66. For these conditions no output signal will be present at amplifier 66, and thus no ramp signal will be generated on line 74. When the $\phi_{n+9}$ signal (which in practice is a square wave signal) rises in potential it resets bistable circuit 96 and removes the signal on line 98. The signal on line 99 prevents an output from the NOR gate 100, thus, in turn, preventing the generation of a ramp. This assures that a firing pulse will not be generated during this period of time.

When the $\phi_{n+9}$ signal drops in potential, NOR gate 100 provides a signal to terminal 89 of amplifier 66. When this occurs amplifier 66 causes transistor 73 to conduct which conduction charges capacitor 76. As capacitor 76 charges, a ramp signal is generated on line 74. Feedback is provided to terminal 71 through the resistor 81. The ramp signal on line 74 is compared with the loop error voltage (line 83) and when the ramp signal reaches a predetermined level (when compared to the error voltage) an output occurs on line 85. This output is the firing pulse which is coupled to the gate of the SCR.

The duration of the pulse on line 85 is determined by the timing circuit comprising resistor 91 and capacitor 92. When the charge on capacitor 92 reaches a predetermined level the bistable circuit 96 is set (via line 94). When this occurs a signal appers on line 98. This signal removes the signal applied to terminal 89 of amplifier 66 by the NOR gate 100. Once this signal is removed, the ramp signal is lost and the firing pulse on line 85 terminates. Thus, the duration of the firing pulse is primarily determined by the RC time constant of the resistor 91 and capacitor 92. (The feedback from resistor 87 provides hysteresis, thereby preventing "chattering").

Unlike prior art circuits which employ the (input) AC power signal to start the generation of the ramp signals, the ramp signals generated by the ramp generator of FIG. 2 are initiated by the output of the phasing means 64. The square wave outputs of phasing means 64 are undistorted and substantially independent of distortion on the power lines.

If the frequency of the AC power signal drifts from the frequency of the oscillator, this frequency difference will be detected by the detectors 33, 34, 35 and a signal will be produced on line 37. This signal, after passing through the lowpass filter, will correct the frequency of the oscillator 50 so that the signals $\phi_1$ through $\phi_{12}$ remain synchronized with the input AC signal. Moreover, the signal on line 57 will be coupled to the amplifier 66 (through resistor 70) and the slope of the ramp signal on line 47 will be appropriately adjusted.

It has been determined that by converting the (input) AC power signal into a plurality of signals of different phases ($\phi_1'$ through $\phi_{12}'$) and by comparing these signals in the phase detectors with a plurality of phased signals ($\phi_1$ through $\phi_{12}$) developed from the oscillator 50, system error is substantially reduced. Also by operating the oscillator 50 at a higher frequency than the frequency of the AC power signal, more stability is obtained in the phase locked loop which includes the oscillator 50, divider 61, phasing means 64, phase detectors 33, 34 and 35, and the lowpass filter.

Thus a circuit has been described for providing firing pulses for SCRs, or like devices. The circuit operates well even where the AC power signal is distorted.

I claim:

1. In a rectifier means for rectifying an alternating current power signal with silicon controlled rectifiers, or the like, where said rectifiers are controlled by a firing circuit which is responsive to said power signal, an improvement comprising:
    an oscillator means for providing an oscillator signal, said oscillator coupled to said firing circuit;
    a phase detection means for comparing the phase of said oscillator means with the phase of said power signal, said phase detection means coupled in a closed loop with said oscillator means;
    whereby an undistorted signal from said oscillator means is coupled to said firing circuit.

2. The improvement defined by claim 1 wherein said closed loop includes a lowpass filter.

3. The improvement defined by claim 2 wherein said oscillator signal is employed by said firing circuit to initiate the generation of ramp signals.

4. The improvement defined by claim 3 wherein said lowpass filter is coupled to said firing circuit and wherein the slope of said ramp signals is controlled by a signal from said filter.

5. The improvement defined by claim 1 wherein said power signal is an $n$-phase power signal and wherein said phase detection means includes means for converting said $n$-phase power signal to more than $n$ signals, each of different phase.

6. In a circuit for providing firing pulses for silicon controlled rectifiers, or the like, which circuit compares a ramp signal generated by a ramp generator with a loop error voltage or with a reference voltage, an improvement comprising:
    a electrically controlled oscillator coupled to said ramp generator; and
    a phase detector, said oscillator and phase detector coupled in a closed loop;
    whereby an undistorted signal from said oscillator is coupled to said ramp generator.

7. In a rectification means for rectifying an $n$-phase power signal with silicon controlled rectifiers, or the like, a circuit for controlling said rectifiers comprising:
    converting means for converting said $n$-phase power signal to more than $n$-phased signals;
    an oscillator;
    phasing means for converting an output of said oscillator to a plurality of signals each of different phase;
    phase detection means for detecting phases of signals coupled to said converting means and said phasing means, said phase detection means providing an output signal coupled in a closed loop with said oscillator and phasing means for controlling the frequency of said oscillator; and,
    a plurality of pulse generation circuits for generating firing pulses for said rectifiers, said pulse generation circuits coupled to said phasing means;
    whereby undistorted signals are generated for controlling said plurality of pulse generation circuits.

8. The circuit defined by claim 7 wherein each of said pulse generation circuits include a ramp generator and a comparator and wherein each of said ramp generators receive one of said signals of different phase from said phasing means.

9. The circuit defined by claim 8 including a lowpass filter coupled between said phase detection means and said oscillator.

* * * * *